United States Patent [19]

Keough et al.

[11] Patent Number: 5,087,293
[45] Date of Patent: Feb. 11, 1992

[54] AGGLOMERATION PROCESS UTILIZING EMULSION

[75] Inventors: William J. Keough, Toronto; Donald L. Parker, Thornhill; Neil L. Smith, Oakville, all of Canada

[73] Assignee: Iron Tiger Investments Inc., Burlington, Canada

[21] Appl. No.: 627,135

[22] Filed: Dec. 13, 1990

Related U.S. Application Data

[63] Continuation-in-part of Ser. No. 498,659, Mar. 9, 1990, abandoned.

[51] Int. Cl.⁵ .............................................. C22B 1/244
[52] U.S. Cl. ......................................... 75/771; 75/325
[58] Field of Search .......................... 75/320, 325, 771

[56] References Cited

U.S. PATENT DOCUMENTS

| | | | |
|---|---|---|---|
| 2,808,325 | 10/1957 | Subervie | 75/771 |
| 3,966,427 | 6/1976 | Herment et al. | 75/771 |
| 4,865,642 | 9/1989 | Huddleston | 75/313 |

*Primary Examiner*—Melvyn J. Andrews
*Attorney, Agent, or Firm*—Rogers, Bereskin & Parr

[57] ABSTRACT

A process is described for the agglomeration of fine particles utilizing a combustible agglomerating agent dispersed in an aqueous emulsion. The process is particularly directed to the handling of fine metal containing particles, originating as by-products or waste products of metallurgical processes, which are to be stored or recycled to metal extractive process steps. The amount of agglomerant added as aqueous emulsion to the particles, is calculated by correlating in an empirical formula the bulk density and the average particle size of the particles, with the emulsified combustible agglomerating agent to be added expressed as weight percent of the particles. The calculated amount of combustible agglomerating agent is emulsified in water, then mixed and blended with the particles, which usually comprise particles of non-uniform size distribution. The aqueous emulsion may also be formed in-situ on the surface of the particles, and the mixture is then blended to form agglomerates. The mixture which is advantageously at a temperature above the ambient, is allowed to cool and be compacted by its own weight. The dust free agglomerates obtained may be stored or charged directly to smelting or refining process steps.

13 Claims, No Drawings

AGGLOMERATION PROCESS UTILIZING EMULSION

This application is a continuation-in-part of application Ser. No. 07/498,659, filed Mar. 9, 1990, now abandoned.

FIELD OF THE INVENTION

This invention relates to the field of agglomerating small dust-like particles.

The invention described herein is an improved process utilized in agglomerating small particles for recycling to extractive processes or similar uses.

BACKGROUND OF THE INVENTION

Metallurgical processes frequently produce by-products which are of small and non-uniform particle size. Such by-products often contain value metals and may be returned to extractive process steps for further metal recovery. The metals in by-products most frequently considered for recovery in a recycling step, are one or more of the following:

| | | |
|---|---|---|
| Copper | Titanium | Aluminium |
| Zinc | Manganese | Germanium |
| Nickel | Niobium | Zirconium |
| Cobalt | Molybdenum | Precious & Noble Metals |
| Chromium | Cadmium | Platinum Group Metals |
| Tungsten | Tin | |
| Vanadium | Lead | |

Other metals and their compounds may also be considered for recovery, depending on their abundance in the by-product or on the nature and use of the particular metal.

The process of the present invention is directed to metallurgical by-products in which non-ferrous metals predominate. For the sake of clarity, copper, zinc, nickel, cobalt, chromium, molybdenum, manganese, cadmium are sometimes referred to as transition metals, and tungsten, vanadium, titanium, zirconium, vanadium, niobium, molybdenum and tantalum are sometimes referred to as refractory metals. However, there is no clear division between these metals. Their recovery by recycling the dust or by-product which contains them, depends on usual economic considerations.

By-products, or waste products containing the metals to be recovered by recycling to extractive process steps may originate in various metallurgical installations, such as electrostatic precipitators and condensers. By-products may also be obtained as fumes, vapour deposited residues, dross, crushed spillage, and residues found in ladles and such like. Spent catalysts of various chemical processes, metal containing particles obtained from previously commercially used items which have valuable metallic components, such as for example, used catalysts of the automotive industry, are often returned to metallurgical processes to be re-extracted.

Particles entrained by slag are sometimes liberated by grinding. Value metals may also be retained in bricks of furnace lining, and may be separated by crushing such bricks. Slime and residue of electrolytic processes often contain metals which may be recovered by recycling to smelting process steps.

Various metal working processes may also yield waste products which may be a source of metals to be recovered by recycling.

The above are some of the more common sources of dust and small particles having non-uniform size range which may be recycled to metallurgical process steps for recovery. There may be other processes related to utilizing metals and providing metal particle-containing by-products or waste products, which then may be considered economically suitable for recycling to extractive metallurgical installations.

It will be clear to a person skilled in the art that there are many reasons why dust particles originating in metallurgical processes, or a by-product of such processes, should be prevented from being airborne, either during being charged to a furnace or during storage. It is the object of an agglomerating process to eliminate, or at least substantially reduce the probability of such particles of small size being easily airborne. It will also be apparent that the cost of agglomeration of the above discussed dust particles should be kept as low as possible.

In our U.S. Pat. No. 4,865,642, a process is described wherein particles originating in metallurgical processes may be agglomerated by mixing the dust with a combustible agglomerating agent. In that process the amount of combustible agglomerating agent added to the by-or waste product is related to the bulk specific gravity and to the particle size range of the dust to be agglomerated.

It has now been found that the process of agglomerating dust particles by mixing with a combustible agglomerating agent may be unexpectedly improved by mixing the dust particles with the combustible agent in the form of an aqueous emulsion, as distinct from being added in a fluid but undiluted state. It has been found that when utilizing an aqueous emulsion of the combustible agglomerating agent, a larger number of small particles may be coated and thereby agglomerated by the same amount of agglomerating agent, than it is possible when the agglomerating agent is brought to a fluid state by mere melting. It is to be noted, that the water added in the aqueous emulsion, is not permanently retained by the dust particles.

The amount of agglomerating agent required in the improved agglomerating process is reduced, resulting in reduced cost of agglomeration.

It is known to utilize a binder mixture, which contains amongst other components aqueous emulsions of hydrocarbonaceous substances, in briquetting ores, ore waste materials, blast furnace by-products, etc. It is to be noted, that briquetting is a process which applies a substantial force to the surface of the agglomerates, and that this force is applied substantially uniformly over the total surface of the agglomerate. If there is excess moisture or oil present in the mixture of dust and binder, such excess is usually squeezed out during briquetting and thereby removed. Moreover, the briquetting step is usually followed by an induration or heat treatment step, to allow the binder to form chemical bonds and thereby increase the strength of the briquettes. It is also to be noted that briquetting requires expensive equipment; thus briquetting and the subsequent heat treatment of the agglomerates may substantially increase the cost of the agglomeration process.

U.S. Pat. No. 2,828,325 issued to A. R. Subervie on Oct. 1, 1957, discloses a process for pelletizing, in a suitable press, agglomerates of dust and a binder mixture. The binder mixture of the process of the above patent comprises an aqueous emulsion of a hydrocarbonaceous material, ground solid pitch and an hydraulic binder. The role of the hydraulic binder in the binder mixture is to absorb and react with the water present in the agglomerates formed with the dust and the binder mixture. The requirement of having a hydraulic binder in this process increases the cost of waste product agglomeration. Furthermore, the subsequent feeding of the hydraulic binder containing pellets to a metallurgical furnacing operation is likely to increase the slag burden with the attendant economic effect.

U.S. Pat. No. 3,966,427, issued to R. Herment et al. on June 29, 1976, discloses a process directed to briquetting ore particles or wet cakes originating in a steel mill with a bituminous emulsion. The Herment et al. process requires bitumens which have a certain well-defined melting point range. The bitumen emulsion of U.S. Pat. No. 3,966,427 is stabilized by alkali metal hydroxide and resin additions, or in the instance of agglomerating an aqueous steel mud slurry, by the alkalinity of the water contained in the mud. Thus, the aqueous bitumen emulsions utilized require the presence of soaps or saponifiers, or control of the pH of the water present in the emulsion. Such additional process steps make the utilization of bituminous emulsion more costly. Furthermore, the agglomerates of mud particles mixed with the bitumen emulsion need to be compressed to form briquettes.

It is to be pointed out that in the prior art processes utilizing hydrocarbon-containing emulsions as briquetting agents, the waste product, or by-product particles to be briquetted, contain substantial amounts of iron compounds. It is well-known that iron and carbon under compression and reducing conditions combine to form a temporary binder. It is doubtful that agglomerating iron deficient dust particles with an aqueous bitumen emulsion may be achieved in the absence of an alkali emulsifying agent, and without the application of compacting by pressure.

SUMMARY OF THE INVENTION

The present invention provides a cost effective improved process for agglomerating dust and similar particles comprising non-ferrous metals and compounds thereof, having non-uniform size distribution and having originated in metallurgical processes, with a combustible agglomerating agent. The dust particles are added and mixed with a calculated amount of combustible agglomerating agent, in accordance with an empirical formula. In the empirical formula the bulk specific gravity of the particles, BD, which has been determined as the weight of the dust particles contained in unit volume, the particle size range, S, which has been determined as the sieve hole size allowing passage of 50 percent by weight of the dust particles, and the amount of agglomerating agent to be added to the dust particles, Aa in weight percent, are correlated to provide an R factor such that $$BD(g/cm^3) \times \frac{S(\mu m)}{100} \times Aa(wt. \%) + 2Aa(wt. \%) = R$$

and wherein the value of the factor R falls between 4 and 200, provided the calculated amount of agglomerating agent Aa is added as an aqueous emulsion.

In one embodiment of the improved process the amount of agglomerating agent (Aa) satisfying the empirical formula, is emulsified, and then is mixed with the dust particles. In another embodiment of the improved process the melted agglomerating agent and the water are added separately for forming in-situ emulsion on the surface of the particles. The mixture of dust and emulsion is blended then compacted by its own weight at ambient temperature.

It has been found that the above process can be used for agglomerating both very fine dust particles, as well as particles which contain larger granular particles mixed with very fine particles.

It is also possible to mix dust particles obtained in several different metallurgical process steps, and then obtain compacts of this mixture.

The addition of the agglomerating agent in the form of an emulsion is unlikely to affect the combustibility of the agglomerant.

In order to provide for a better understanding of the present invention, the preferred embodiments of the invention will be described hereinbelow and illustrated by way of working examples.

The valuable metal-containing particles, such as dust and condensate collected in fume hoods, electrostatic precipitators, cyclones, or similar solid particle collecting devices, particles collected by means of granulating slag or dross, slime produced in electrolytic processes collected then dried, or any other granules or particles containing metals which are waste and/or by-products of metallurgical processes, will be referred to hereinafter as dust particles.

The physical characteristics of the dust particles considered when calculating the required range of the amount of agglomerating agent to be used for obtaining compacts, are relatively easy to determine and do not require elaborate instrumentation. The bulk specific gravity is measured in weight per unit volume, usually in grams per cubic centimeter ($g/cm^3$, or $Kg/m^3$). The bulk specific gravity will also give some guidance regarding the degree of fineness of the particles when this value is compared to the specific gravity of the material when measured in a solid block. The bulk specific gravity of the dust particles under consideration is hereinafter sometimes denoted by BD.

The amount of agglomerating agent required for compacting dust particles is calculated by considering the size range of the particles as well. The smaller the particles the larger is the amount of agglomerant required to turn the particles into agglomerated compacts. The particle size ranges may be easily determined by so-called sieve tests. In these determinations the weight percent of the material which passes through the holes of a certain sized sieve is measured. The diameter or mesh size of the holes is given in microns ($\mu m$ or $10^{-6}$ m) In the preferred embodiment the specific sieve size (S) is considered which allows 50 wt. % of the dust particles to pass through it. This is referred to as the average particle size of the dust particles. It is usual to find a hyperbolic relationship between the sieve size in microns ($\mu m$) and the weight percent of particles passing through a particular sieve size.

The preferred agglomerating agent in the present invention is a hydrocarbon wax, which may be the by-product of a crude oil distillation process or the residue of other known hydrocarbon separation processes. In applying the present invention to metallurgical dust particles it is a requirement that the agglomerating agent be substantially combustible, such that when the obtained agglomerates are charged to the smelter the hearth temperature is not diminished by a notable degree. Moreover, it is found that the combustible agglomerating agent contributes in providing the heat energy required to smelt the dust particles added as agglomerates. In other words, it is an important facet of the process of the present invention that the heat required to melt the dust particles and the admixed agent is provided at least partly, by the combustion of the agglomerating agent. In comparison, a non-combustible agglomerating agent would require an additional amount of heat energy to melt it, and would in most cases, additionally increase the slag burden.

Depending on the origin of the wax, the wax usually contains some oil. The agglomerating agent utilized in the preferred embodiments of this invention is a hydrocarbon wax usually containing less than 30 wt. % oil. Such hydrocarbon waxes are commercially available at relatively low cost. It is desirable, but not essential, that the wax applied in the present invention be non-fluid at ambient temperature.

A hydrocarbon wax, sometimes referred to as unrefined wax, is generally considered to be a long-chained hydrocarbon molecule having substantially hydrogen saturated carbon to carbon bonds. Some other types of organic compounds, containing oxygen and nitrogen atoms as well, may also fall into this broad category. A hydrocarbon oil is understood to be a similar, essentially carbon and hydrogen containing, long-chained or branched molecule, with a much higher number of unsaturated carbon bonds than are to be found in a wax.

In the preferred embodiments of this invention the metal-containing dust particles are mixed and blended with an aqueous emulsion containing a hydrocarbon wax agglomerating agent.

Any substantially fully combustible material which is not fluid at ambient temperature, such as tar, or residual oil, may also be utilized in compacting dust particles according to the present invention.

As it has been outlined hereinabove, it has been found that a convenient way to correlate the amount of agglomerating agent to the bulk specific gravity and to the particle size range of the dust particles, is to derive an empirical expression which is comprised of the multiplication product of the average particle size (S), the bulk specific gravity (BD), and the weight percent of the agglomerating agent (Aa) to be used for compacting the particles, divided by 100, and add to this numerical figure the weight percent of the agglomerating agent (Aa) multiplied by a constant.

The numerical correlation utilized in the preferred embodiment for determining the amount of agglomerating agent required is represented by the following expression:

$$BD(g/cm^3) \times \frac{S(\mu m)}{100} \times Aa(wt. \%) + 2Aa(wt. \%) = R$$

In the preferred embodiment of the improved process the agglomerating agent is present in the form of an aqueous emulsion. It has been found that in instances when the agglomerating agent is emulsified the value of R should generally fall between 4.0 and 200 for obtaining suitable compacts.

It has been found that compacts obtained when the value of the above defined R factor falls between 4.0 and 200, are dust free and may be handled without breaking or crumbling, provided that the compacts have been agglomerated by adding the agglomerating agent in the form of an aqueous emulsion. A person skilled in the art will understand that the size of the agglomerates to be utilized depends on the origin and chemical nature of the dust particles, and also on which stage of the extraction process the agglomerates are to be charged. Thus the manner in which the agglomerates are to be charged, or are to be handled, will determine the desired product form. Easily flowing, dust free granules may be charged by themselves or mixed with other metallurgical feed stock additives, by means of gravity fed transfer lines to or near the side walls of the furnace. Larger coherent compacts may be fed to the molten bath by, for example, a conveyor belt above the smelting installation.

As is to be expected, the cost of practising the process of the present invention is proportional to the amount of agglomerating agent used. Hence economic considerations will also play a part in deciding the format of the agglomerated product.

In one of the preferred embodiments of the invention the hydrocarbon wax used as an agglomerating agent, is first emulsified to form an aqueous emulsion. The emulsion is formed in a conventional manner, that is the wax is dispersed and emulsified by a mechanical mixer in water at above ambient temperature, usually but not necessarily in the presence of an emulsifying agent. The purpose of the emulsifying agent is to stabilize the emulsion and prevent the broken up and usually melted wax particles from coagulating into larger lumps. The wax may be melted by heating above its melting point prior to being mixed with water.

The aqueous emulsion containing the calculated amount of agglomerating agent is optionally made up at the location where the dust particles are available for recycling to a metallurgical operation or to some other use, utilizing solid or semi-solid agglomerating agents. The improved agglomerating process may also be carried out with aqueous emulsions marketed as such by other industries such as, for example, Imperial Oil Limited.

The aqueous emulsion containing the required amount of agglomerating agent may also be prepared in advance of it being utilized from hydrocarbons available commercially, and then stored. In such instances the presence of an emulsifying agent may be necessary.

Hydrocarbon wax which has an emulsifying agent already blended with it is available comercially. An exemplary wax-emulsifying agent blend is, for instance, ESSO 778E, marketed by Esso Petroleum Canada. ESSO 778E contains anionic emulsifying agent. In this case water is added in the required amount to make up the aqueous emulsion having the desired wax content.

Aqueous agglomerating agent emulsions may also be prepared by utilizing commercially available hydrocarbon products and mixing such a product with commercially available emulsifying agents and water. Suitable hydrocarbons are marketed, for example, by Shell Oil Canada as Slack Wax, and by International Waxes Limited as unrefined wax No. IWL 431. Emulsifying agents to be added in amounts suggested by the manufacturer are available, for example, from Elkaril Chemicals of Ontario Canada, marketed as ELKA Surf NP-6; also from Canada Packers, sold as fatty acid emulsifiers. Emulsifying agents are also marketed by Hart Chemical Ltd., Ontario Canada. There are numerous emulsifying agents available other than those briefly mentioned hereinabove. The choice of the emulsifier most appropriate under the circumstances of utilization of the agglomerates is left to the skilled technician. The aqueous wax emulsion is made up in the conventional manner.

The emulsion and the dust particles may be stored separately at ambient temperature, and then mixed and blended mechanically at a temperature elevated above the ambient temperature.

In other methods of application of the present invention either the particles may be preheated prior to mixing or the emulsion may be preheated, or both components may be preheated before mixing at, or above ambient temperature. It is also acceptable to preheat the components separately and mix them at ambient temperature.

One of the more advantageous form of applying the improved process of agglomerating dust particles, is preparing the emulsion by mixing hot water with molten agglomerating agent with agitation in a conventional manner, and immediately mixing the emulsion obtained with the dust particles to be agglomerated.

It is convenient to use a rotating drum with some form of mixing means to produce a well-blended mixture of dust particles and emulsified agglomerating agent. The drum may or may not be heated, according to convenience. Other forms of mixing and blending apparatus may also be used.

Another of the preferred embodiments of the present improved process of agglomerating dust particles, is the utilization of an aqueous emulsion formed in-situ. The particular advantage of this embodiment is that it may be conducted without a separate emulsifying process step, or emulsifying means. The dust to be agglomerated is wetted to the desired degree by a hot water spray, and subsequently sprayed and blended with the calculated amount of hot, fluid agglomerating agent. Thorough mixing is beneficial in order to attain a uniform distribution of the emulsion over the dust particles.

The formation of an in-situ emulsion may also be achieved by first applying a hot spray of the fluid hydrocarbon to the dust particles, followed by a second spray of hot water. The mixture of wax, water and dust particles are then blended to produce a homogenized semi-fluid mixture.

The dust blended with the in-situ emulsion obtained by either of the above described methods is advantageously at a temperature which is above the melting point of the agglomerating agent.

A further advantage of agglomerating dust particles by means of emulsions formed in-situ, is that hydrocarbon waxes without emulsifying additives may be used. This may lead to a further reduction in the cost of recycling metallurgical dust.

It was found that the ratio of the hydrocarbonaceous agglomerating agent to water, in the emulsion utilized in any of the above described methods for agglomerating dust particles, may range between 10:90 to 70:30. The preferred range of the hydrocarbon emulsified in water is 10% to 50%.

The choice of any one of the above sequences for obtaining a mixture comprising the dust particles and the emulsified agglomerating agent, is dictated by convenience only.

In any event, it is beneficial if the resulting mixture of the dust particles and the emulsion containing the agglomerating agent, is at an elevated temperature before the mixture is compacted.

The blended hot mixture is then charged by suitable means to either a container or onto a moving belt, to be allowed to cool and be compacted by its own weight. The cooled and solidified agglomerates may be stored for later use, or charged as they are produced to a metallurgical furnacing installation.

The method, operation and application of the preferred embodiments of the present invention will now be further illustrated by working examples.

EXAMPLE 1

Dust recovered from electrostatic precipitators of a smelting operation and containing nickel, copper and iron compounds, was compacted in a laboratory operation. 3,800 grams of such metallurgical dust, having an average particle size of 50 $\mu$m and a bulk density of 2.94 g/cm$^3$, were heated to a temperature of 140° F. (60° C.) in an electrically heated crucible. In another container 100 grams of ESSO 778E* wax were heated in a bath to 180° F. (84° C.), and the melt was dispersed in 100 grams water, using a laboratory stirrer. The water was heated to 190° F. (88° C.) prior to its addition. The emulsion was stabilized by a commercially available emulsifying agent, which was previously incorporated in the marketed ESSO 778E* hydrocarbon wax. The emulsion so produced was stable and did not separate on standing.

*Marketed by ESSO Petroleum Canada

The aqueous emulsion containing 50% wax was then mixed with the heated metallurgical dust and blended manually. The resulting slurry was poured into a casting tray and allowed to form briquettes of approximate volume of 25 cu.cm, compacted by its own weight.

The R factor calculated using the above figures, i.e., BD=2.94, S=50 $\mu$m and agglomerating agent (Aa)wt. %=2.6, had a value of 8.9.

The cooled product was very firm, dustless and had a grainy structure that resisted fracture. A second batch of similar composition as above, was prepared by pouring the warm slurry onto a moving belt and allowing it to cool on the belt. The product was granular in form and had free flowing granules larger than 1 mm in diameter. The granular product was completely dustless and resisted fracturing when handled.

EXAMPLE 2

1,900 grams of the nickel- and copper-containing dust originating in an electrostatic precipitator were mixed with 1,900 grams of dust obtained in the baghouse of a fluid bed roaster. The dust originating in the fluid bed roaster was composed predominantly of nickel, copper and iron oxides. The average particle size (S) of this dust mixture was 74 $\mu$m and its bulk specific gravity (BD) was 3.44 g/cm$^3$.

A wax emulsion, having 50% by weight ESSO 778E wax solid content was prepared as in Example 1.

The emulsion was mixed and blended with 3,800 grams of the above metallurgical dust mixture. The mixing was carried out manually at 160° F.

The R factor value was calculated in this example as:

$$3.44 \times \frac{74}{100} \times \frac{100}{38} + \frac{200}{38} = 12.0$$

Briquettes and granules were obtained by the same process steps as in Example 1. Both types of agglomerates having been compacted by their own weight were completely dust-free, extremely hard and fracture resistant.

EXAMPLE 3

1,740 grams of a lead smelter dust mixture obtained as dust collected as fumes in the sinter process and dust from the electrostatic precipitator of the sinter handling system were agglomerated. The dust mixture had very large particle size range and contained granules as large as ¼" and fine dust smaller than 0.2 μm. The average particle size was 10 μm, and due to its fineness, the bulk density of the dust mixture was as low as 1.24 g/cm³.

200 grams of ESSO 778E wax was dispersed in 600 grams of water, providing an emulsion having 25% by weight solid content. The emulsion was prepared as described in Example 1. The emulsion was mixed and blended with the dust which had been preheated to 160° F. The hot mixture of dust and wax was compacted by its own weight, providing granules and briquettes as described in Example 1.

R factor of this mixture was calculated as:

$$1.24 \times \frac{10}{100} \times \frac{200}{1940} + \frac{400}{1940} = 21.9$$

Agglomeration of the lead smelter dust was excellent, producing granules of +2 mm in size. The briquettes obtained were extremely hard. There was no dusting when handling either forms of agglomerates.

EXAMPLE 4

1,740 grams of metallurgical dust originating in a lead smelting operation were treated in the laboratory by the agglomerating process steps described in Examples 1 and 2. The lead-containing dust had an average particle size (S) of 60 μm and bulk specific gravity (BD) of 5.5 g/cm³.

An emulsion containing 20 grams of ESSO 778E wax was prepared as in Example 1. The wax content of the emulsion was 50% by weight.

The temperature and method of blending were similar to those of the previous examples.

The R factor value of this blended mixture was calculated to be 5.8.

The product was obtained in granulated form. The granules were +2 mm in size, and were hard and free of dust formation.

The above Examples were carried out using laboratory equipment. In a large-scale commercial operation, the previously prepared wax emulsion would be applied to the preheated dust, utilizing, for example, a non-atomizing, low pressure nozzle. The mixture obtained would be blended in a ribbon mixer, followed by blending in a rotary drum mixer at about 160° F. The hot blended mixture would normally be allowed to drop onto a sequence of travelling belts and cooled by spraying with cold water issuing from jets. The product obtained in this manner is usually granulated, ready to be charged to various stages of the smelting operation.

EXAMPLE 5

Noble metal containing spent catalyst particles were agglomerated with a combustible agglomerating agent for charging to the converter process step of a commercial non-ferrous metal extractive operation. The noble metal bearing dust particles had an average particle size of 100 μm and bulk density of 3.1 g/cm³.

It was calculated by using the empirical formula incorporating the above bulk density and average particle size values that an R factor having a value of 20.5 is obtained if the amount of combustible agglomerating agent is added at the rate of 4 wt. %. Moreover, it was found that the hydrocarbon wax agglomerating agent could be conveniently added as an aqueous emulsion having a wax:water composition of 1:5 (17% wax content).

The aqueous emulsion was formed in-situ on the particles. The hydrocarbon wax utilized in this Example contained no emulsifying agent additives, and was marketed by ESSO Petroleum Canada under the trade name of ESSO 778. The in-situ emulsion was obtained by the step sequence described below, and blended with the particles to provide agglomerates.

96 grams of the noble metal bearing particles were heated to 56° C., then sprayed with 20 grams water at 65° C., and blended. 4 grams of ESSO 778 wax were heated in a separate container to 80° C. The hot melted wax was distributed over the heated wet particles and blended thoroughly by hand. The blended mixture was allowed to cool and solidify into irregular agglomerates. The agglomerates were granular having 1-2 mm average size which were relatively free-flowing without any sticking and completely free of dusting.

EXAMPLES 6-9

A dust obtained as the by-product of a nickel-copper smelting operation was agglomerated for the purpose of recycling to the smelters for further copper and nickel recovery. The dust was of non-uniform size distribution, and had an average particle size of 100 μm. The bulk density of the dust was estimated to be 2.8 g/cm³.

The metallurgical dust having the above characteristics was agglomerated to form dust-free granules utilizing ESSO 778 wax-water emulsions formed in-situ.

The above dust was agglomerated by different step sequences described below. The weight percent of wax for a range of wax-water emulsions was calculated by the use of the empirical formula of the present improved process and applied as in-situ wax-water emulsion. The quantities of dust agglomerated in this series of examples, the wax and water added, the R factors obtained under these circumstances, and the wax:water ratios are listed in Table 1.

The in-situ emulsions were formed by two different step sequences, and the resulting agglomerates were compared with respect to their suitability for being fed to furnacing operations.

In Test A: Dust and water were first heated to 65° C. over a water bath, and then mixed. The wax (ESSO 778) was heated separately to 80° C., then distributed evenly over the wetted dust and the mixture blended by hand.

In Test B: The dust was heated to above 65° C. and then mixed with the wax, which has been previously heated to 80° C. The dust mixed with the wax was then mixed and blended with water at 65° C. temperature.

In both tests A and B the agglomerates obtained were allowed to cool to ambient temperature, compacted by their own weight. The agglomerates obtained by either Test A or Test B and having compositions characterized by the figures listed in Table 1, were all granular, easily flowing without exhibiting any stickiness, as well as being completely free of dusting. The average particle size of the granules was 1-2 mm. For the sake of clarity, free of dusting is understood to mean that small, micron sized dust particles are not separated from the granules by a stream of air blown through the granules, hence these may be fed to the furnace without dust being formed during charging.

TABLE 1

| Example | Wt of Dust, g | ESSO 778 added, g | Wax Wt. % | R Factor | Water added, g | Wax: Water |
|---|---|---|---|---|---|---|
| 6 | 500 | 12.5 | 2.44 | 11.7 | 113 | 10:90 |
| 7 | 400 | 30 | 7.00 | 33.6 | 30 | 50:50 |
| 8 | 192 | 10 | 4.95 | 23.8 | 38 | 21:79 |
| 9 | 195 | 5 | 2.50 | 12.0 | 35 | 13:87 |

It can be seen that wax contents as low as 2.44% in weight will provide very satisfactory agglomerates when the agglomerating wax is added as an aqueous emulsion formed in-situ. Thus agglomerates which are highly suitable to be recycled to a furnacing operation for further recovery may be obtained with a low cost agglomerating agent and in the absence of expensive blending process and equipment.

The weight only of the combustible hydrocarbonaceous agglomerating agent in the emulsion which is added to form the agglomerates, is incorporated in the calculations utilizing the empirical formula of this invention, and the weight of water is omitted. Since it is not known what portion of the water added as a component of the emulsion is retained in the agglomerates, the weight of water is not considered in the calculation of the R factor of the agglomerates. It is estimated that a substantial portion of the water forming the hydrocarbonaceous agglomerant-water emulsion is lost during blending and the subsequent cooling and solidification steps. At any event, Examples 6-9 show clearly that the wax:water ratio in the emulsion is not critical within the range of 10 to 50% wax content.

The method of agglomeration described and illustrated in the foregoing, is directed to recovering valuable metals from dust particles originating in metallurgical processes by agglomerating and subsequently feeding the resulting larger sized compacts or granules to various furnacing operations. The method of agglomeration is also applicable to obtaining compacts for storage and for preventing dust particles from becoming an environmental hazard.

Although the present invention has been specifically described with reference to a preferred embodiment, it is to be understood that modifications and variations may be resorted to without departing from the spirit and scope of the invention, as those skilled in the art will readily understand. Such modifications and variations are considered to be within the purview and scope of the invention claimed.

We claim:

1. In a method of agglomerating dust particles comprising non-ferrous metals and compounds thereof, having non-uniform size distribution and having originated in metallurgical processes, with a combustible agglomerating agent by first weighing a unit volume of said dust particles and determining the bulk specific gravity of said dust particles expressed as weight of said particles contained in a unit volume, secondly, weighing an amount of said dust particles and passing it through a series of sieves in sequence of diminishing hole sizes, thereby obtaining the particle size range of said dust particles, thirdly, calculating by a first calculation the amount of combustible agglomerating agent required to agglomerate said dust particles comprising non-ferrous metals and compounds thereof into compacts, by utilizing an empirical relationship, wherein an agglomerating R factor is related to (a) the bulk specific gravity as first determined, (b) the particle size range of said particles as secondly determined, and (c) the amount of agglomerating agent, such that $$R = \left(BD \times \frac{S}{100} \times Aa\right) + 2Aa,$$

in said empirical relationship BD being bulk specific gravity (g/cm$^3$), S being the sieve hole size ($\mu$m) allowing the passage of 50 wt. % of said particles, and Aa being the wt. % of agglomerating agent to be added to said particles, the improvement comprising the steps of,
 (a) calculating the amount of agglomerating agent required according to said empirical relationship, to derive an R factor having a value between 4.0 and 200 provided that said amount of combustible agglomerating agent is added in the form of an aqueous emulsion,
 (b) calculating by a second calculation the amount of water required to make up said aqueous emulsion with said amount of agglomerating agent obtained by the first calculation,
 (c) producing said aqueous emulsion comprising said calculated amounts of agglomerating agent and water by a method selected from the group of methods consisting of: emulsifying said agglomerating agent in water prior to mixing with said dust particles, and forming the emulsion in-situ of said agglomerating agent and water on the surface of said dust particles, and thereafter
 (d) blending said aqueous emulsion with said dust particles and compacting said blended particles by their own weight at ambient temperature.

2. A method according to claim 1, wherein said aqueous emulsion also comprises an emulsifying agent.

3. A method according to claim 1, wherein said aqueous emulsion is produced in a separate process step prior to being blended with said dust particles, and wherein said agglomerating agent is first heated above its melting point and subsequently is dispersed in said calculated amount of water.

4. A method according to claim 1, wherein said aqueous emulsion contains 15-70 wt. % combustible agglomerating agent.

5. A method according to claim 1, wherein said combustible agglomerating agent is one of the group consisting of hydrocarbon wax, heavy residual oil, tar, and pitch.

6. A method according to claim 1, wherein said dust particles are heated to above-ambient temperature prior to being blended with said aqueous emulsion comprising said calculated amount of combustible agglomerating agent.

7. A method according to claim 1, wherein said emulsion is at above-ambient temperature prior to being blended with said dust particles.

8. A method according to claim 3, wherein said emulsion is at above-ambient temperature prior to being blended with said dust particles.

9. A method according to claim 1, wherein said emulsion is blended with said dust particles at above-ambient temperatures.

10. A method according to claim 1 wherein said emulsion is produced in-situ by first mixing said particles with said calculated amount of water and thereafter said wet particles are mixed with said calculated amount of agglomerating agent, said agglomerating agent having first been heated to above its melting point.

11. A method according to claim 10, wherein said water and said particles are at a temperature above the ambient prior to mixing them with said melted agglomerating agent.

12. A method according to claim 1, wherein said emulsion is produced in-situ by first mixing said dust particles with said calculated amount of agglomerating agent which has been previously heated to above its melting point and thereafter mixing the mixture so obtained with said calculated amount of water.

13. A method according to claim 12, wherein the water is heated above ambient temperature prior to mixing it with the mixture of dust particles and agglomerating agent.

* * * * *